(12) United States Patent
Miller

(10) Patent No.: US 7,071,627 B2
(45) Date of Patent: Jul. 4, 2006

(54) LIGHTING SYSTEM AND METHOD

(76) Inventor: Peter Miller, 33 Purcell Way, Shefford, Bedfordshire (GB) SG17 5RY ( * ) Notice: Subject to any disclaimer, the term of this patent is extended or adjusted under 35 U.S.C. 154(b) by 0 days.

(21) Appl. No.: 10/362,409

(22) PCT Filed: Feb. 11, 2002

(86) PCT No.: PCT/EP02/01495
§ 371 (c)(1),
(2), (4) Date: Sep. 16, 2004

(87) PCT Pub. No.: WO03/005777
PCT Pub. Date: Jan. 16, 2003

(65) Prior Publication Data
US 2005/0017654 A1 Jan. 27, 2005

(51) Int. Cl.
*H05B 41/16* (2006.01)
*B60L 1/14* (2006.01)
(52) U.S. Cl. ..................... 315/141; 307/10.8
(58) Field of Classification Search .............. 315/82, 315/291, 247
See application file for complete search history.

(56) References Cited

U.S. PATENT DOCUMENTS

| 4,641,126 A * | 2/1987 | Crowe ................... 340/310.02 |
| 5,517,064 A * | 5/1996 | Murakami ................. 307/10.1 |
| 6,204,652 B1 * | 3/2001 | Albou et al. ................ 323/284 |
| 2003/0057886 A1 * | 3/2003 | Lys et al. .................... 315/291 |
| 2003/0222587 A1 * | 12/2003 | Dowling et al. ............. 315/149 |
| 2005/0083066 A1 * | 4/2005 | Tani et al. ................... 324/509 |

FOREIGN PATENT DOCUMENTS

| DE | 198 13 595 A1 | 9/1999 |
| FR | 2 792 159 A1 | 10/2000 |
| FR | 2 809 924 A1 | 12/2001 |
| GB | 2 219 896 A | 12/1989 |
| WO | WO 00 19777 A1 | 4/2000 |

OTHER PUBLICATIONS

"PWM Von 14V KFZ-Lampen an Hoeherer Spannung." Research Disclosure, Kenneth Mason Publications, Hampshire, GB, No. 431 Mar. 2000, p. 476.

* cited by examiner

*Primary Examiner*—Don Wong
*Assistant Examiner*—Angela M Lie

(57) ABSTRACT

A lighting system and method (1) is disclosed having a pulse-width modulation (PWM) lighting system and method for use in environments where the PWM ratio is variable, for example though not exclusively, in 42V and/or dual-voltage electrical systems in automotive applications.

8 Claims, 1 Drawing Sheet

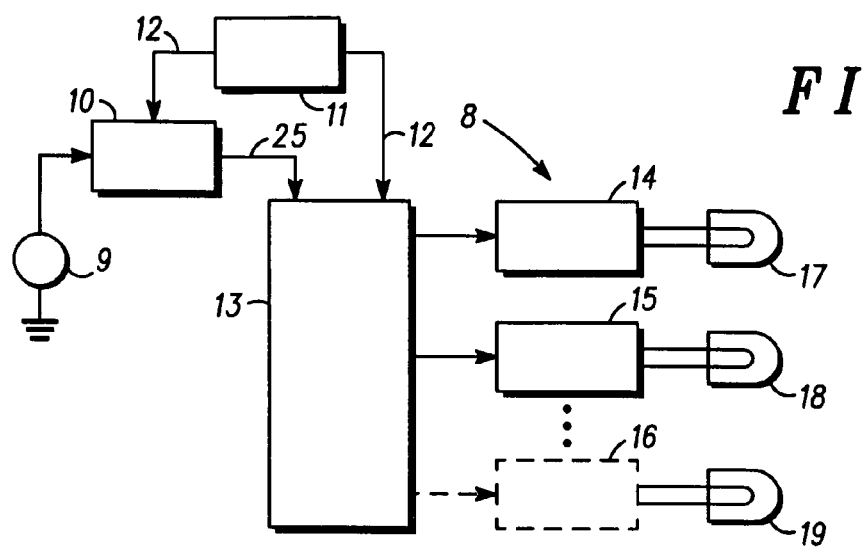
*FIG. 1*
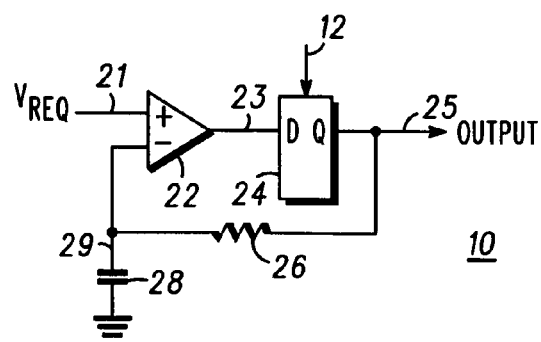
*FIG. 2*
*FIG. 3*
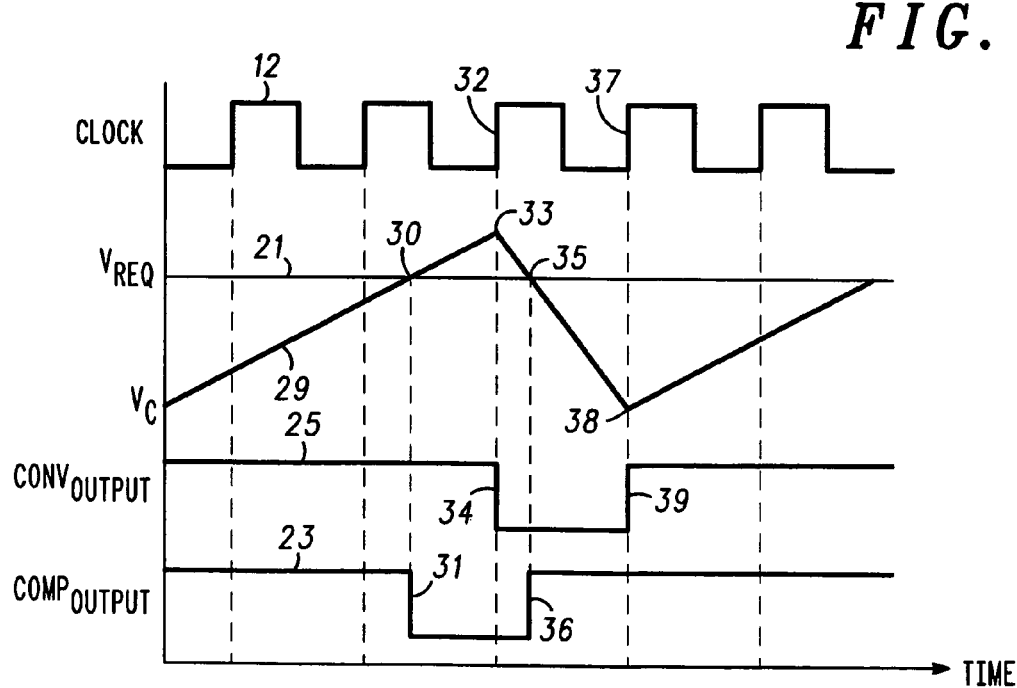

LIGHTING SYSTEM AND METHOD

FIELD OF THE INVENTION

The present invention relates generally to a lighting system and method. More specifically, the invention relates to a pulse-width modulation (PWM) lighting apparatus and method, for example though not exclusively, for use in 42V automotive applications wherein the PWM mark-space ratio is variable.

BACKGROUND OF THE DISCLOSURE

Lighting of incandescent lamps or light bulbs in, for example, automotive applications typically involves a driving a 12V filament. However, developments in the automotive industry have been made to introduce vehicles with 42V electrical systems and dual voltage electrical systems.

Vehicles with dual voltage electrical systems require two batteries having nominal voltages of 14V and 42V (12V and 36V rated batteries respectively). The 12V battery typically has a high amp-hour rating and is used to provide energy to 14V loads such as lighting circuits, which are difficult to implement at higher voltages, and other applications for example driving 12V resistive loads, like small heaters, and 12V inductive loads, like motors, relays, solenoids. The 36V battery typically has a high cranking current capability and is coupled to a 42V generator and higher voltage loads, which may include the engine starter motor. However, compared with single voltage electrical systems, having an additional power rail such as the 12V power rail in the dual-voltage electrical system increases cost, adds additional weight and reduces efficiency in the system.

Vehicles with 42V electrical systems require a 36V rated battery that is coupled to a 42V generator, as in the dual voltage electrical system. Clearly, in 42V electrical systems all electrical systems, including the lighting system, must be driven by the 36V rated battery.

There are currently several lighting arrangements for 42V and dual voltage electrical systems. A first lighting arrangement that is presently not very practical is to drive incandescent lamps with 42V filaments. However, filaments for 42V/36V are too long and fragile. The 42V/36V bulb filaments are relatively thin filaments when compared to filaments in 12V bulbs, for example, for the same power at 42V/36V filament of the same diameter would be 9 times the length, or alternatively ⅓ the diameter of a 12V filament. 43V/36V bulbs are presently unpractical to use because the thin filaments results in a lifetime that would be unacceptably low in the automotive environment.

Another lighting arrangement that has been proposed for 42V and dual voltage electrical systems is a DC—DC converter to step 42V down to 14V/12V. Although this system provides the convenience of 12V bulbs, it is an expensive solution to implement the DC—DC converter and such a system consumes, for example, more than 300 W. For these reasons, using a DC—DC converter is also presently not practical to implement in an automotive environment.

There are also lighting systems that us PWM for driving lamps. Such a system is disclosed in SU909805. PWM systems typically operate at 120 Hz to replicate 50 to 60 Hz AC operation. However, especially where multiple lights are switched on together, very high peak currents, which may rupture the bulb filament, are reached in the wiring of the lighting system resulting in excessive heat and electromagnetic interference. In 42V applications, for example, when a bulb is first switched on a large current surge flows in a 42V/36V PWM system, which may be three times as large as 12V DC system, which may rupture the bulbs filament. For these reasons, such PWM lighting systems are unacceptable in an automotive environment.

Therefore, there is a need in the art for a cost effective and power efficient way to power a bulb with a lower voltage tolerance, for example 12V or 6–8V, from a higher voltage supply, for example 42V/36V as used in automotive systems and/or 24V as used in truck systems, in an environment wherein the PWM mark-space ratio is variable such as for example in a 42V or dual-voltage electrical automotive systems.

STATEMENT OF THE INVENTION

In accordance with the present invention there is provided a lighting system as claimed in claim 1, and a lighting method as claimed in claim 4.

BRIEF DESCRIPTION OF THE DRAWINGS

Embodiments of the invention will now be more fully described, by way of example, with reference to the drawings, of which:

FIG. 1 is a schematic block diagram of lighting apparatus according to a an embodiment of the invention;

FIG. 2 is a schematic block diagram of a lighting apparatus according to an embodiment of the invention; and FIG. 3 is a graph charting the timing of signals according to an embodiment of the invention.

DETAILED DESCRIPTION OF EMBODIMENTS OF THE INVENTION

Referring to FIG. 1, a lighting system and method 1 of an embodiment of the invention is shown. The lighting system 1 may power bulbs with a lower voltage tolerance, for example 12V, from a higher voltage supply, for example 42V, in an environment wherein the PWM mark-space ratio is variable such as for example in a 42V or dual-voltage electrical automotive systems. A clocked PWM converter 10 of the lighting system 1 is supplied a system source voltage or required voltage 9, such as 42V/36V DC power supply as used in 42V or dual-voltage electrical automotive systems.

A clock source 11 supplies a clock signal 12 to the clocked PWM converter 10 and a register 13. The register 13 may be for example an eight-bit shift register. The clock source 11 may be for example, a basic 1 KHz oscillator with 1 ms period, prbs giving a random output frequency between 1–2 KHz with 1 ms period, a filter and digitised random or chaotic source giving 1–2 KHz with 1 ms period, and or three oscillators configured, such as 1 KHz, 1.2 KHz and 1.5 KHz that are connected together with AND gates to give a 1 KHz oscillation with variable period. The examples of oscillators other than the basic 1 KHz oscillator may generate less electromagnetic interference then the basic 1 KHz oscillator because as the energy is spread over a range of frequencies, rather than all appearing at one frequency and its harmonics.

The clocked PWM converter 10 provides an output 25 to the register 13. The register 13 then selectively provides a lighting signal to a bulb driver 14–16 that provides a turning on/off signal to a respective bulb or lamp 17–19. Bulb driver 16 and bulb 19 are in dashed lines in FIG. 1 to show that there may be more than one or two bulbs in the system 1. Of course, it will be appreciated that any type of bulb may be used, and any number of bulbs may be used on this system, from a single bulb to n number of bulbs. Optimal electromagnetic interference and low peak currents may be achieved with placement of the bulb loads on outputs based on probability of simultaneous operation and bulb wattage as well as operating voltage range. These optimum low levels may be achieved by minimising the current ripple on the 42V power input. Bulb driver 14 is also provided with bulb on/off input. The bulb drivers limit the inrush current to the bulbs to a value approximately equal to that when the bulbs are powered from the rated DC voltage.

An example of the clocked PWM converter 10 is shown in FIG. 2. A required voltage 21 is supplied to an input of comparator 22. The comparator 22 also receives a combined feedback signal in the converter circuit 10 from D-type flip-flop 24 that receives clock signal 12 from clock source 11, and resistor 26, and capacitor 28. On the D-type flip-flop 24, Q should switch between 0V and the PWM supply voltage, for example 42V when the lighting system 1 is implemented in a 42V or dual-voltage electrical automotive systems. The values of resistor (R) 26 and capacitor (C) 28 are not critical, as long as R*C>>period of clock input 12, but not so large that the comparator output signal 23 becomes noisy.

The timing diagram of signals in the PWM converter 10 circuit during operation is shown in FIG. 3. The signal on the top of the diagram is the clock signal 12 generated by clock source 11. The inputs to the comparator, that is required voltage signal 21 and the voltage across capacitor 28 (Vc) signal 29, are shown are shown directly below the clock signal. PWM converter output signal 25 and comparator output signal 23 are respectively shown below the comparator input signals 21, 29.

If Vc is less than Vreq, as at the start of FIG. 3, Vc signal 29 increases. As soon as Vc signal 29 reaches Vreq 21 at point 30, the output at comparator 22 changes, for example the comparator output signal 23 goes to zero from one, as shown at point 31. At the next leading edge 32 of the clock signal 12, Vc reaches a maximum value at point 33, and the output 25 of the clocked PWM converter changes, for example the converter output signal 25 goes to one from zero, as shown at point 34. After point 33 the Vc signal 29 drops, and at point 35 the Vc signal 29 again reaches Vreq 21, and the comparator output 23 changes value again, for example from zero to one, as shown at point 36. Vc continues to drop from point 35 until the next leading edge 37 of clock signal 12. At this point Vc reaches minimum value, and the PWM converter output signal 25 changes value again, for example from zero to one, as shown at point 39. It will be appreciated that the signal response of the circuit will repeat, that is from point 38 Vc signal 29 will increase again until Vc reaches Vreq 21.

With this configuration of lighting system 1, the clocked PWM converter 10 may regulate the average output voltage, so keeping the light output constant as the supply rail changes. The clocked PWM converter circuit 10 spreads the bulb switching times so, whenever possible, at most 1 bulb has power at any one instant. In this way, electromagnetic interference and resistive power loss are minimised. To illustrate this, I*I*R=power loss, (where I=current in bulb when run at 12V and R=resistance), in, for an example, a system with 8 bulbs that are switched on at the same time. In conventional systems, this would be worse case scenario because each bulb requires current. Thus the power in wiring in the conventional systems is (3*3*8*8*I*I*R)/9, i.e. "/9" as only on 1/9 time,=64*I*I*R. In contrast, in the lighting system 1 of the embodiments described, when the bulbs are switched one at a time, the power loss is 3*3*I*I*R*8/9, which is 8*I*I*R, that equates to ⅛ the power loss as in the conventional systems. Similarly, electromagnetic interference is reduced by a similar ratio in the lighting system 1 of the embodiments described when compared to the conventional systems.

Similar configurations and embodiments may also be implemented, for example rather than using only one clocked PWM converter 10 as shown, it will be appreciated that in another embodiment multiple clocked PWM converters may be used. With such a multiple clocked PWM converter configuration, with the clocks applied in the correct sequence, each bulb in a system having a plurality of bulbs may be individually dimmed via a control input to the converter. For example, such that the pulse widths on the bulb drivers 14–16 may be limited to a value below the maximum value, may allow individual bulbs 17–19 to be selectively dimmed. One example of achieving this is to combine the signal to the bulb drivers 14–16 from the register 13 with another PWM signal, for example the output of another circuit shown in FIG. 2 where Vreq is a dimming input signal.

In another embodiment, to keep the quiescent current low, the whole clocked PWM converter 10 circuit could be switched off, when for example no lights are required. However, care must be taken when a bulb is switched on that the circuit starts correctly. To ensure that the circuit starts correctly, for example, the outputs of the register 13 may be held reset until the first negative edge is seen on the output signal 25 of the clocked PWM converter 10.

Although particular embodiments of the invention have been described above, various other modifications and improvements may be made by a person skilled in the art without departing from the scope of the present invention.

What is claim is:

1. A lighting system for driving light bulbs having a lower voltage tolerance than the voltage supply to the system, comprising:

a pulse width modulator converter supplied with a required voltage from a system source voltage supply of the system for regulating an average output signal of the pulse width modulator converter supplied to a register to selectively connect the output signal of the pulse width modulator converter to a light bulb selected by the converter supply from a plurality of light bulbs, each light bulb having a lower voltage tolerance than the system voltage, the register and converter synchronised via a clock source, wherein the converter drives a single light bulb at any one time even with a variable PWM mark-space ratio.

2. A lighting system as claimed in claim 1, wherein the system further comprises of a light bulb driver connected between each light bulb and register.

3. A lighting system as claimed in claim 1, wherein the pulse width modulator comprises of a comparator with one input receiving a required voltage, and another input receiving the output signal of the converter from a D-type flip-flop that receives the output signal of the comparator, feedback through a resistor and capacitor, for regulating the average output signal.

4. A lighting system as claimed in claim 2, wherein the pulse width modulator comprises of a comparator with one input receiving a required voltage, and another input receiving the output signal of the converter from a D-type flip-flop that receives the output signal of the comparator, feedback through a resistor and capacitor, for regulating the average output signal.

5. A lighting method for driving light bulbs having a lower voltage tolerance than the voltage supply to the system, comprising the steps of:
supplying a requited voltage from system source voltage from a system source voltage supply;
regulating an average output signal from a pulse width modulator converter supplied with the system source voltage from the source system supply;
supplying the regulated average output signal to a register, the register and converter synchronised via a clock source; and
selectively connecting the output signal of the pulse width modulator converter from the register to a single light bulb at any one time from a plurality of light bulbs, even with a variable PWM mark-space ratio, wherein each light bulb having a lower voltage tolerance than the system voltage supply.

6. A lighting method as claimed in claim 5, wherein the step of selectively connecting the output signal of the pulse width modulator converter from the register to a single light bulb further comprises a light bulb driver connected between each light bulb and register.

7. A lighting method as claimed in claim 5 wherein the step of regulating an avenge output signal from the pulse width modulator converter further comprises comparing at a comparator in the pulse width modulator converter one input receiving the required voltage, with another input receiving the output signal from a D-type flip-flop that receives the output signal of the comparator, feedback through a resistor and capacitor, for regulating the average output signal.

8. A lighting method as claimed in claim 6 wherein the step of regulating an average output signal from the pulse width modulator converter further comprises comparing at a comparator in the pulse width modulator converter one input receiving the required voltage, with another input receiving the output signal from a D-type flip-flop that receives the output signal of the comparator, feedback through a resistor and capacitor, for regulating the average output signal.

* * * * *